(12) United States Patent
Raghavan et al.

(10) Patent No.: US 10,998,943 B2
(45) Date of Patent: May 4, 2021

(54) TECHNIQUES AND APPARATUSES FOR ENHANCED PHASE FEEDBACK IN MILLIMETER WAVE MULTI-USER BEAMFORMING

(71) Applicant: QUALCOMM Incorporated, San Diego, CA (US)

(72) Inventors: Vasanthan Raghavan, West Windsor Township, NJ (US); Jung Ryu, Fort Lee, NJ (US); Miguel Rodrigo Castellanos Llorca, West Lafayette, IN (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 16/041,054

(22) Filed: Jul. 20, 2018

(65) Prior Publication Data
US 2019/0058510 A1 Feb. 21, 2019

Related U.S. Application Data

(60) Provisional application No. 62/547,505, filed on Aug. 18, 2017.

(51) Int. Cl.
*H04B 7/0417* (2017.01)
*H04B 7/0452* (2017.01)
(Continued)

(52) U.S. Cl.
CPC ......... *H04B 7/0417* (2013.01); *H04B 7/0452* (2013.01); *H04B 7/063* (2013.01);
(Continued)

(58) Field of Classification Search
CPC .. H04B 7/0417; H04B 7/0452; H04B 7/0617; H04B 7/0626; H04B 7/063; H04B 7/0695; H04B 7/088
See application file for complete search history.

(56) References Cited

U.S. PATENT DOCUMENTS

| | | | |
|---|---|---|---|
| 2014/0254508 A1* | 9/2014 | Krishnamurthy | H04B 7/0417 370/329 |
| 2016/0142117 A1* | 5/2016 | Rahman | H04B 7/0469 375/267 |

(Continued)

FOREIGN PATENT DOCUMENTS

| | | |
|---|---|---|
| EP | 3116140 A2 | 1/2017 |
| WO | WO-2017025116 A1 | 2/2017 |
| WO | WO-2017107084 A1 | 6/2017 |

OTHER PUBLICATIONS

International Search Report and Written Opinion—PCT/US2018/043272—ISA/EPO—dated Oct. 26, 2018.

*Primary Examiner* — Kent Krueger
(74) *Attorney, Agent, or Firm* — Harrity & Harrity LLP/Qualcomm Incorporated

(57) ABSTRACT

Certain aspects of the present disclosure generally relate to wireless communication. In some aspects, a user equipment (UE) may determine at least one phase estimate for at least one beam received by the user equipment during a beam training or channel estimation procedure; and/or provide the at least one phase estimate to a base station from which the at least one beam is received for the base station to reconstruct an estimated channel matrix of the user equipment. In some aspects, a base station may receive feedback information from a UE identifying phase estimates for a plurality of beams transmitted to the UE, wherein the feedback information relates to a selected beam for the UE and one or more other beams of the plurality of beams; and/or determine an estimated channel matrix for the UE based at least in part on the feedback information. Numerous other aspects are provided.

30 Claims, 10 Drawing Sheets

(51) Int. Cl.
*H04B 7/06* (2006.01)
*H04B 7/08* (2006.01)
(52) U.S. Cl.
CPC ......... *H04B 7/0617* (2013.01); *H04B 7/0626* (2013.01); *H04B 7/0695* (2013.01); *H04B 7/088* (2013.01)

(56) References Cited

U.S. PATENT DOCUMENTS

2018/0183509 A1* 6/2018 Luo ..................... H04B 7/0874
2018/0262246 A1* 9/2018 Faxer ................... H04B 7/0617
2019/0319682 A1* 10/2019 Zhang .................. H04B 7/0617

* cited by examiner

TECHNIQUES AND APPARATUSES FOR ENHANCED PHASE FEEDBACK IN MILLIMETER WAVE MULTI-USER BEAMFORMING

CROSS-REFERENCE TO RELATED APPLICATIONS UNDER 35 U.S.C. § 119

This application claims priority to Provisional Patent Application No. 62/547,505, filed on Aug. 18, 2017, entitled "TECHNIQUES AND APPARATUSES FOR ENHANCED PHASE FEEDBACK IN MILLIMETER WAVE MULTI-USER BEAMFORMING" which is hereby expressly incorporated by reference herein.

FIELD OF THE DISCLOSURE

Aspects of the present disclosure generally relate to wireless communication, and more particularly to techniques and apparatuses for enhanced phase feedback in millimeter wave (mm Wave) multi-user beamforming.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a user equipment may include determining at least one phase estimate for at least one beam received by the user equipment during a beam training or channel estimation procedure; and/or providing the at least one phase estimate to a base station from which the at least one beam is received for the base station to reconstruct an estimated channel matrix of the user equipment, wherein the at least one phase estimate is provided with at least one of at least one beam index corresponding to the at least one beam, at least one measurement associated with the at least one beam, or information identifying a cross-correlation associated with the at least one beam.

In some aspects, a user equipment for wireless communication may include a memory and one or more processors, operatively coupled to the memory, configured to determine at least one phase estimate for at least one beam received by the user equipment during a beam training or channel estimation procedure; and/or provide the at least one phase estimate to a base station from which the at least one beam is received for the base station to reconstruct an estimated channel matrix of the user equipment, wherein the at least one phase estimate is provided with at least one of at least one beam index corresponding to the at least one beam, at least one measurement associated with the at least one beam, or information identifying a cross-correlation associated with the at least one beam.

In some aspects, a non-transitory computer-readable medium may store one or more instructions for wireless communication. The one or more instructions, when executed by one or more processors of a user equipment, may cause the one or more processors to determine at least one phase estimate for at least one beam received by the user equipment during a beam training or channel estimation procedure; and/or provide the at least one phase estimate to a base station from which the at least one beam is received for the base station to reconstruct an estimated channel matrix of the user equipment, wherein the at least one phase estimate is provided with at least one of at least one beam index corresponding to the at least one beam, at least one measurement associated with the at least one beam, or information identifying a cross-correlation associated with the at least one beam.

In some aspects, an apparatus for wireless communication may include means for determining at least one phase estimate for at least one beam received by the apparatus during a beam training or channel estimation procedure; and/or means for providing the at least one phase estimate to a base station from which the at least one beam is received for the base station to reconstruct an estimated channel matrix of the apparatus, wherein the at least one phase estimate is provided with at least one of at least one beam index corresponding to the at least one beam, at least one measurement associated with the at least one beam, or information identifying a cross-correlation associated with the at least one beam.

In some aspects, a method for wireless communication performed by a base station may include receiving feedback information from a user equipment (UE) identifying phase estimates for a plurality of beams transmitted to the UE, wherein the feedback information relates to a selected beam for the UE and one or more other beams of the plurality of beams; and/or determining an estimated channel matrix for the UE based at least in part on the feedback information.

In some aspects, a base station for wireless communication may include a memory and one or more processors, operatively coupled to the memory, configured to receive feedback information from a UE identifying phase estimates for a plurality of beams transmitted to the UE, wherein the feedback information relates to a selected beam for the UE and one or more other beams of the plurality of beams; and/or determine an estimated channel matrix for the UE based at least in part on the feedback information.

In some aspects, a non-transitory computer-readable medium may store one or more instructions for wireless communication. The one or more instructions, when executed by one or more processors of a base station, may cause the one or more processors to receive feedback information from a UE identifying phase estimates for a plurality of beams transmitted to the UE, wherein the feedback information relates to a selected beam for the UE and one or more other beams of the plurality of beams; and/or determine an estimated channel matrix for the UE based at least in part on the feedback information.

In some aspects, an apparatus for wireless communication may include means for receiving feedback information from a user equipment (UE) identifying phase estimates for a plurality of beams transmitted to the UE, wherein the feedback information relates to a selected beam for the UE and one or more other beams of the plurality of beams; and/or means for determining an estimated channel matrix for the UE based at least in part on the feedback information.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
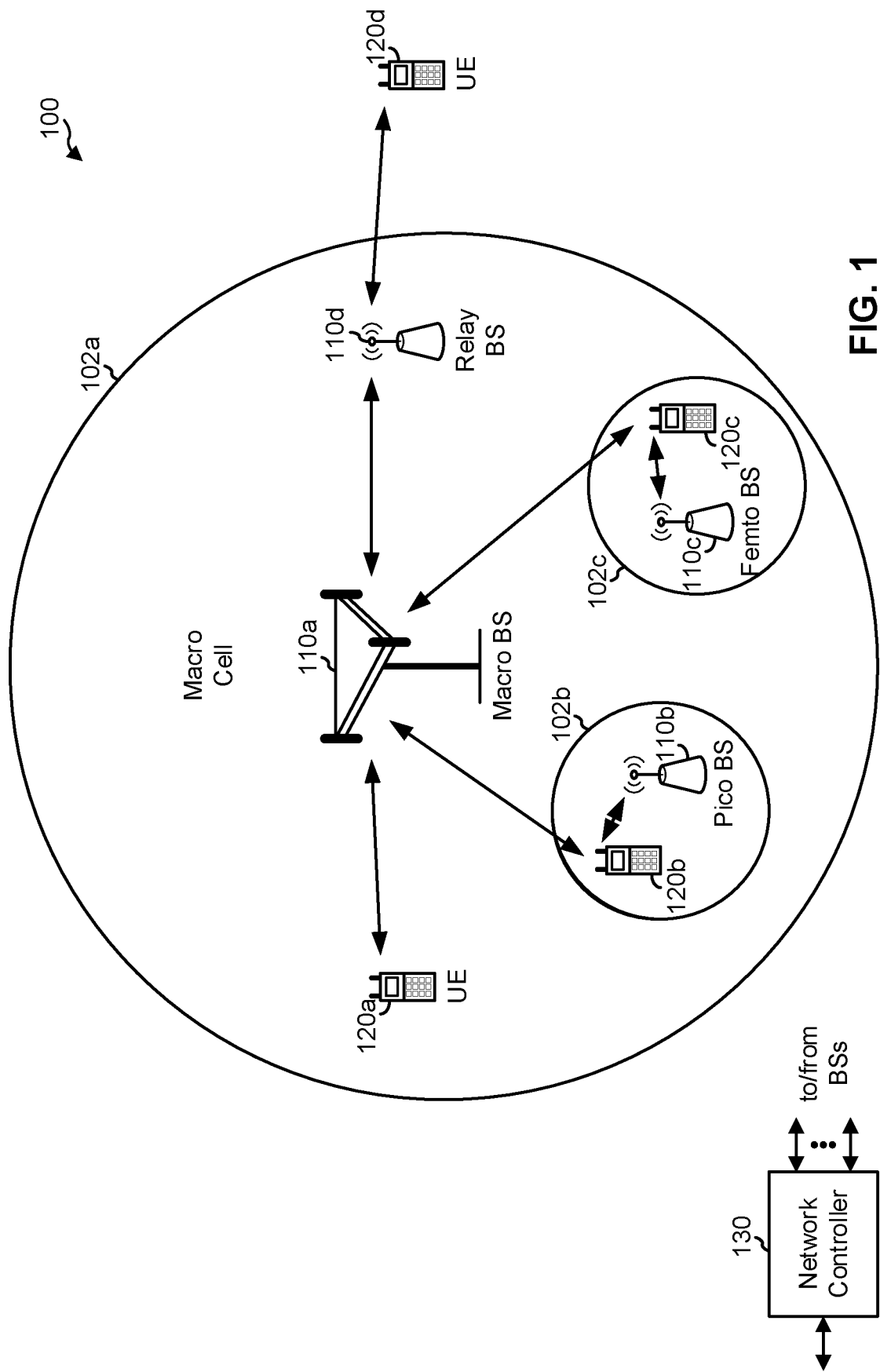
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
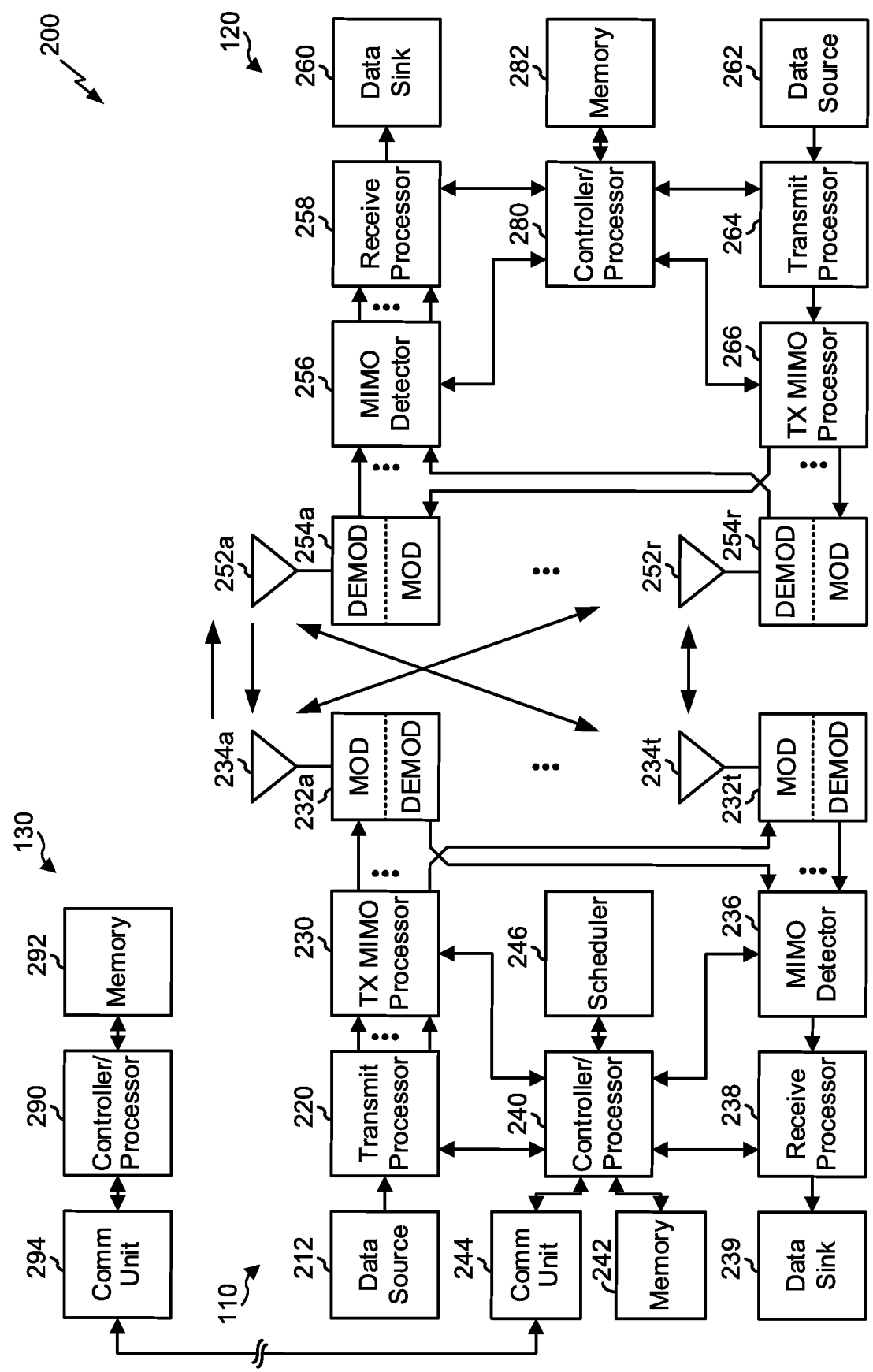
FIG. 2 is a block diagram conceptually illustrating an example of a base station in communication with a user equipment (UE) in a wireless communication network, in accordance with various aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at BS 110 and UE 120, respectively, to perform enhanced phase feedback in mm Wave multi-user beamforming. For example, controller/processor 280 and/or other processors and modules at UE 120 may perform or direct operations of UE 120 to perform enhanced phase feedback in mm Wave multi-user beamforming. For example, controller/processor 280 and/or other controllers/processors and modules at UE 120 may perform or direct operations of, for example, process 600 of FIG. 6 and/or other processes as described herein. For example, controller/processor 240 and/or other processors and modules at BS 110 may perform or direct operations of BS 110 to perform enhanced phase feedback in mm Wave multi-user beamforming. For example, controller/processor 240 and/or other controllers/processors and modules at BS 110 may perform or direct operations of, for example, process 700 of FIG. 7 and/or other processes as described herein. In some aspects, one or more of the components shown in FIG. 2 may be employed to perform example process 600, example process 700, and/or other processes for the techniques described herein. Memories 242 and 282 may store data and program codes for BS 110 and UE 120, respectively. A scheduler 246 may schedule UEs for data transmission on the downlink and/or uplink.

In some aspects, UE 120 may include means for determining at least one phase estimate for at least one beam received by the UE 120 during a beam training or channel estimation procedure, means for providing the at least one phase estimate to a base station from which the at least one beam is received for the base station to reconstruct an estimated channel matrix of the UE 120, and/or the like. In some aspects, such means may include one or more components of UE 120 described in connection with FIG. 2.

In some aspects, BS 110 may include means for receiving feedback information from a UE 120 identifying phase estimates for a plurality of beams transmitted to the UE 120, means for determining an estimated channel matrix for the UE 120 based at least in part on the feedback information, means for scheduling communications with the plurality of UEs 120 using respective beams associated with the estimated channel matrix, wherein the respective beams are selected based at least in part on the estimated channel matrix, and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3:
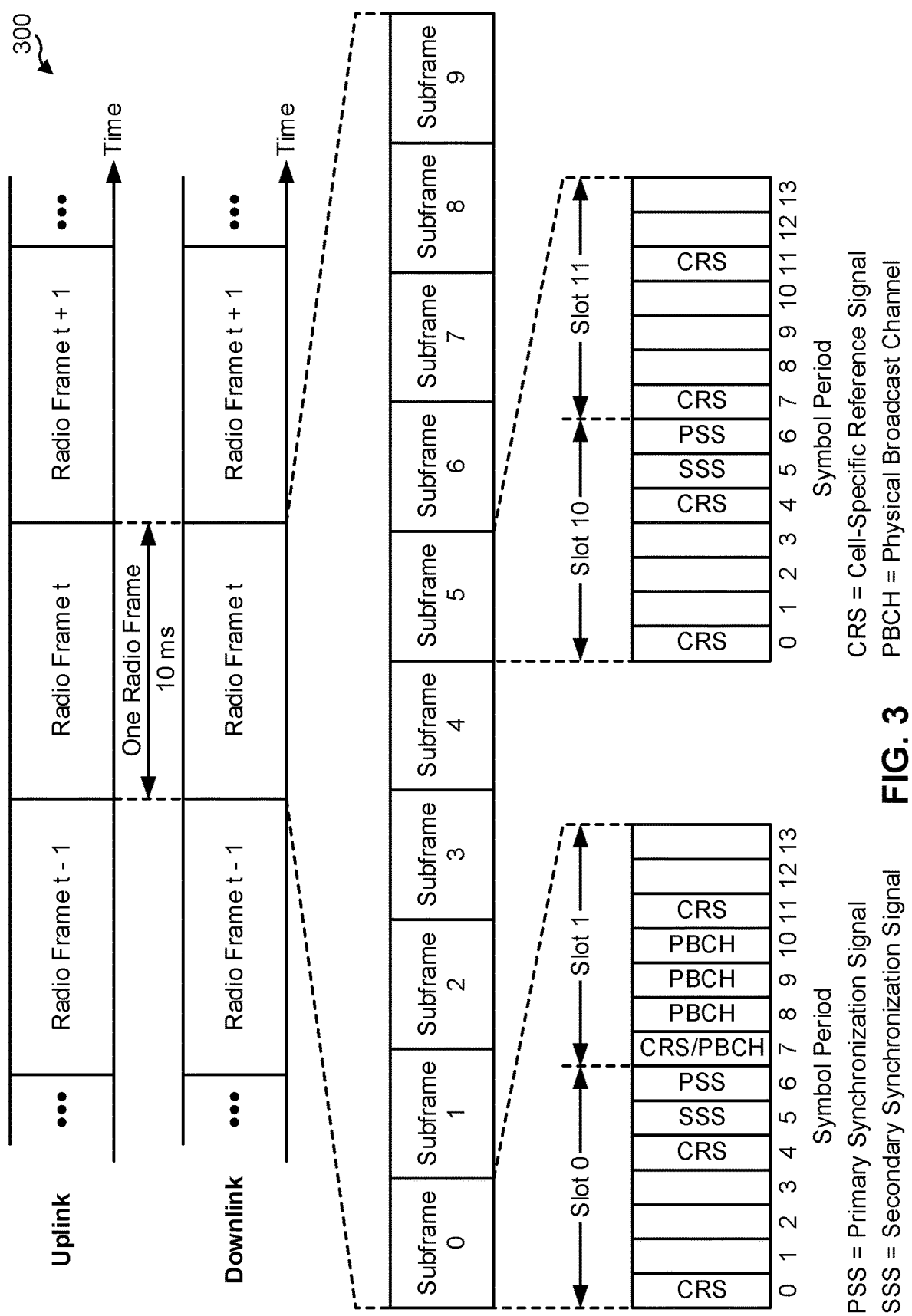
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
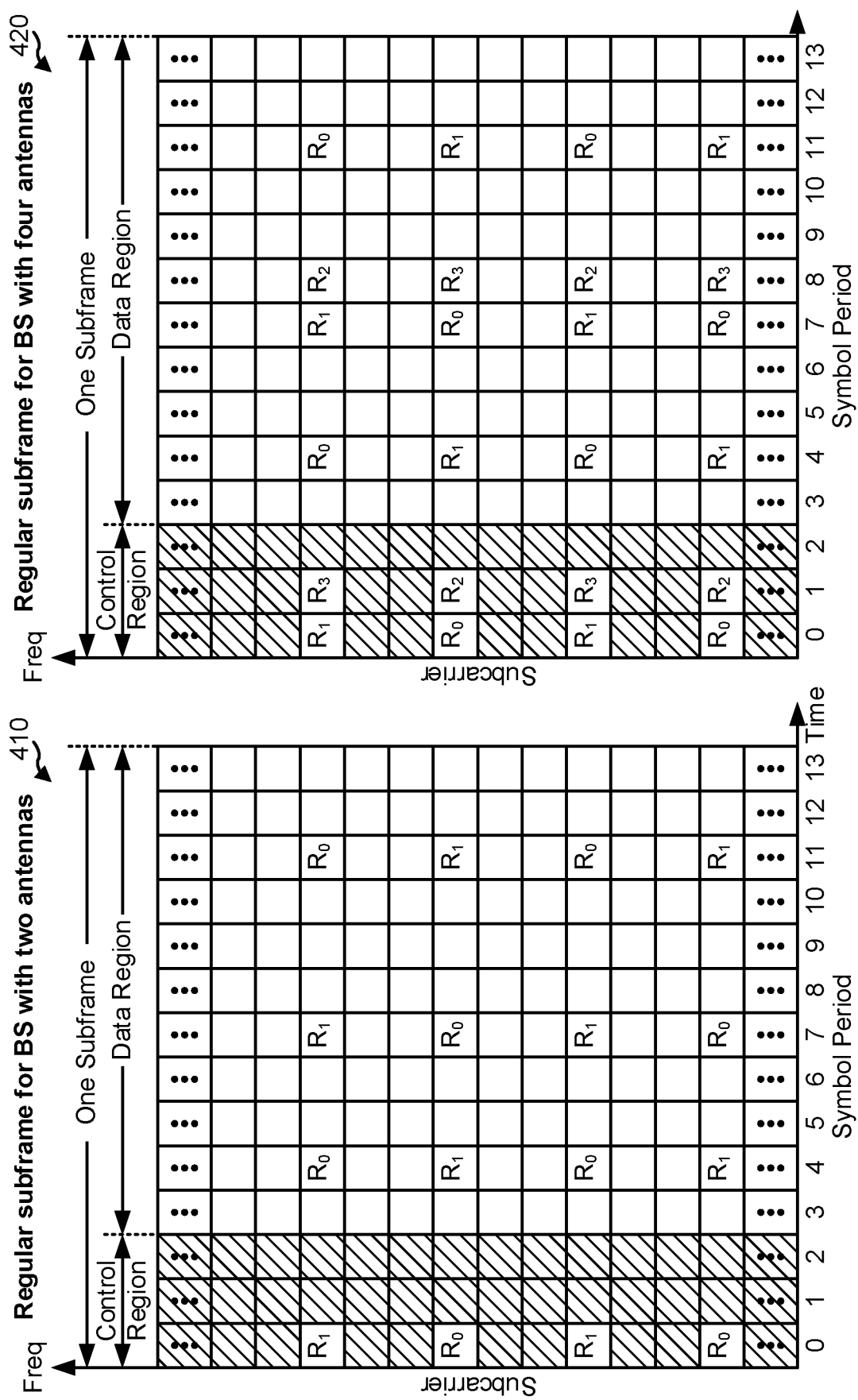
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The radio access network (RAN) may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

A BS 110 may communicate with a UE 120 using beams that are directed to the UE 120 using a beamforming process. Beamforming may be particularly helpful in a mm Wave context because mm Wave beams may have a diminished range in comparison to lower-frequency waves. When performing beamforming, a BS 110 may transmit multiple beams to a UE 120, and the UE 120 may provide feedback identifying one or more desirable beams. For example, the one or more desirable beams may be associated with a highest power (e.g., RSRP and/or the like), signal quality, signal strength, and/or the like. The BS 110 may use a best beam of the one or more desirable beams to communicate with the UE 120. When communicating with multiple UEs 120, each UE 120 may provide feedback to the BS 110, and the BS 110 may identify beams for communicating with the multiple UEs 120 based at least in part on the feedback. For example, the BS 110 may use a multi-layer transmission for a single UE 120, or may use one or more layers for multiple, different UEs 120.

However, the BS 110 may lack some feedback information that would be useful for configuring communications with UEs 120. For example, it may be beneficial for the BS 110 to estimate a state of a channel at the UE 120 as accurately as possible. However, when the UE 120 does not provide certain information to the BS 110, such as phase information and information regarding a UE-specific codebook used to determine the feedback information, the BS 110 may be unable to estimate the state of the channel with sufficient accuracy to improve downlink performance.

Some techniques and apparatuses described herein improve channel estimation of a BS 110 based at least in part on providing an estimate of phase for one or more beams at a UE 120. By using the estimate of the phase, the BS 110 can more accurately estimate channel conditions at the UE 120, which improves downlink performance for the UE 120. Furthermore, the BS 110 may schedule communications with the UE 120 and/or other UEs 120 based at least in part on the estimation of the channel at the UE 120, which may improve utilization of resources of the BS 110 and/or increase capacity of the BS 110.

Figure 5A:
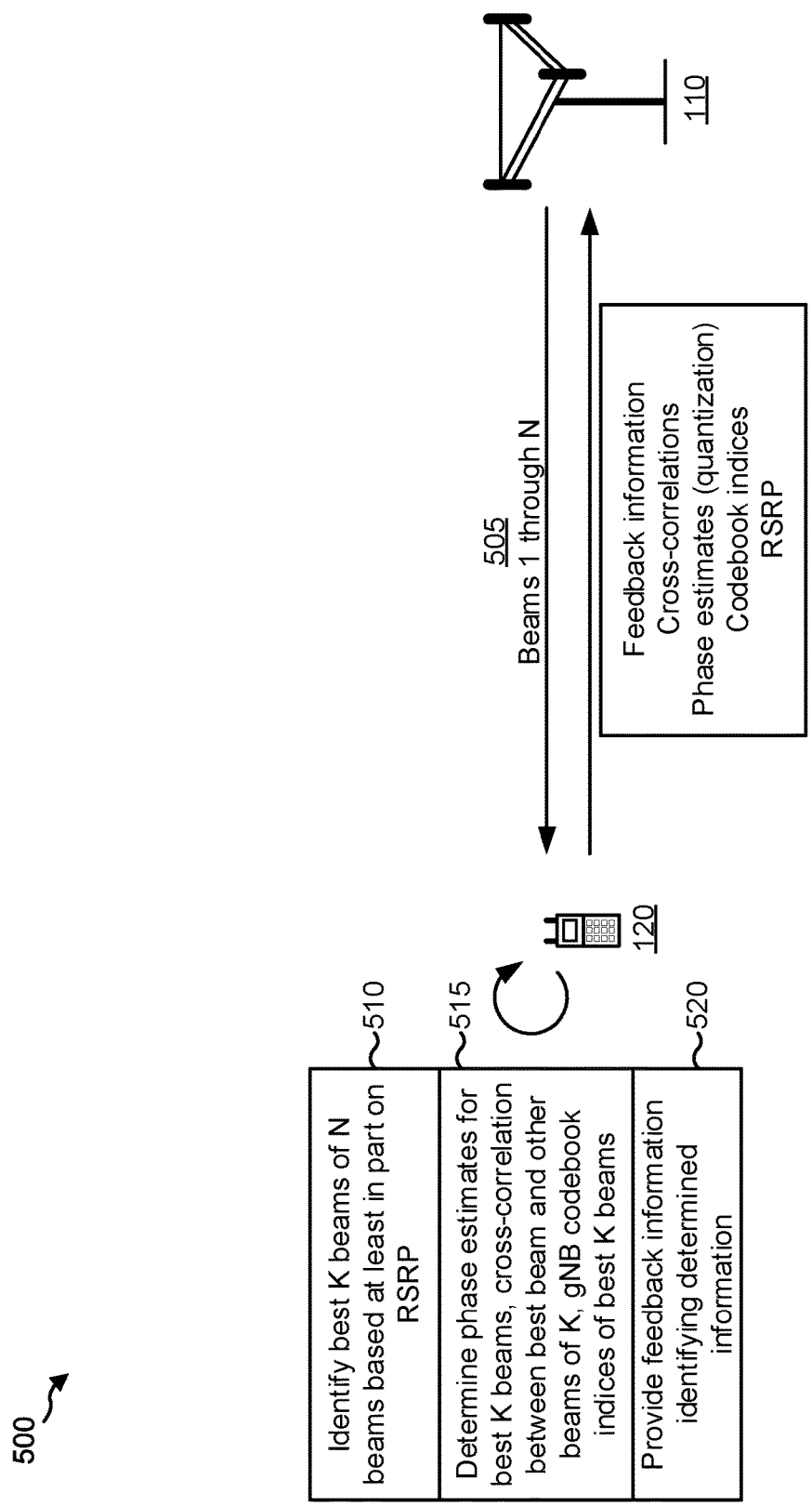
FIGS. 5A and 5B are diagrams illustrating examples of enhanced phase feedback in mm Wave multi-user beamforming, in accordance with various aspects of the present disclosure.
Figure 5B:
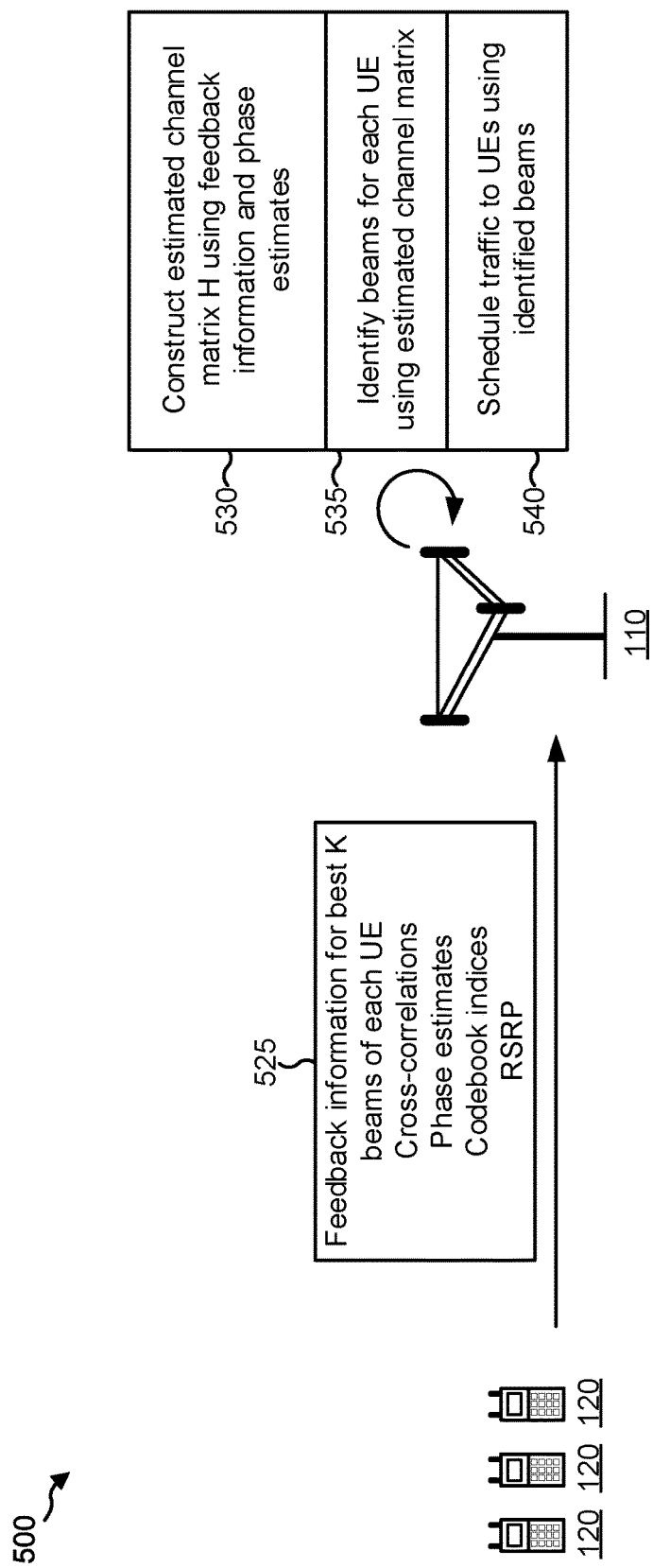

FIGS. 5A and 5B are diagrams illustrating examples 500 of enhanced phase feedback in mm Wave multi-user beamforming, in accordance with various aspects of the present disclosure.

As shown in FIG. 5A, and by reference number 505, a BS 110 may provide beams 1 through N to a UE 120. For example, the BS 110 may provide beams 1 through N as part of a beam training or channel estimation procedure. The beams 1 through N may be associated with differences in directionality, path, precoding, and/or the like. In some aspects, each beam of the beams 1 through N may be associated with a respective gNB codebook index. For example, the BS 110 may generate the beams 1 through N based at least in part on a corresponding codebook entry associated with a codebook index value.

As a more particular example, the signal received by the UE 120 may be represented by the following Equation 1:

$$y_i = g_i^H \cdot \left[ H_i \cdot \left( \sum_{m=1}^{S} \sqrt{P_m} \, f_m s_m \right) + n_i \right], i = 1, \ldots, S \quad \text{Equation 1}$$

Equation 1 describes signals for a UE 120-$i$, of a set of UEs 120-1 through 120-S. In Equation 1, $y_i$ represents the signal received by the UE 120-$i$, $g_i^H$ represents a UE-specific codebook entry used by UE 120-$i$ to process the received signal, $H_i$ represents a channel for the UE 120-$i$, $P_m$ is a channel estimation or training power for an mth UE 120 of UEs 120-1 through 120-S, $f_m$ is a gNB codebook (e.g., common codebook) value used to generate the signal, $s_m$ is a data symbol for the mth UE, and $n_i$ is an additive noise value.

As shown by reference number 510, the UE 120 may identify a best K beams of the beams 1 through N. For example, K may be equal to or greater than 1. In some aspects, the UE 120 may identify a selected beam (e.g., a best beam) and one or more other beams. In some aspects, the best K beams may be selected based at least in part on one or more measurements, such as an RSRP value, an RSRQ value, a spatial filtering approach to avoid selection of beams that are spatially close to each other, and/or the like.

As shown by reference number 515, the UE 120 may determine respective phase estimates for the best K beams. For example, the UE 120 may determine a phase estimate based at least in part on a reference signal (e.g., a demodulation reference signal (DMRS), a channel state information reference signal (CSI-RS), and/or the like). In some aspects, an ith UE 120 may determine a phase estimate for an mth beam of beams 1 through K based at least in part on Equation 2:

$$\psi_m^{(i)} = \angle (g_{Tr,k_m}^{(i)})^H H_i f_{TR,j_m}^{(i)} \qquad \text{Equation 2}$$

In Equation 2, $\psi_m^{(i)}$ is a phase of the mth beam, $g_{Tr,k_{(m)}}^{(i)}$ is an eNB codebook entry for the mth beam, $H_i$ is a channel of the ith UE 120, and $f_{Tr,j_m}^{(i)}$ is a UE-specific codebook value for the mth beam. Equation 2 may be an idealized representation of the phase of the channel H.

However, the phase estimation may be associated with inherent noise. Therefore, the UE 120 may estimate the phase based at least in part on Equation 3:

$$\psi_{pr,m}^{(i)} = \angle (g_{Tr,k_m}^{(i)})^H [\sqrt{P_{Tr,i}} H_i f_{TR,j_m}^{(i)} + n_{Tr,i}] \qquad \text{Equation 3}$$

Equation 3 may provide an estimated value of the phase that is determined based at least in part on an additive noise value for the ith UE 120 and a channel estimation or training value for the ith UE 120.

In some aspects, the UE 120 may determine a quantized value of the phase. For example, the determination of the phase may be associated with inherent noise and/or inaccuracy. For this reason, and to conserve resources of the UE 120 and the BS 110, the UE 120 may determine a bit-quantized value corresponding to the phase, such as a B-bit quantized value. For example, the UE 120 may use Equation 4 to determine the B-bit quantized value.

$$\hat{\psi}_{pr,m}^{(i)} \in \left\{ 0, 2\pi \cdot \frac{1}{2^B}, 2\pi \cdot \frac{2}{2^B}, \ldots, 2\pi \cdot \frac{2^B - 1}{2^B} \right\} \qquad \text{Equation 4}$$

As shown in Equation 4, the phase (e.g., $\hat{\psi}_{pr,m}^{(i)}$) may be selected from a set of possible values based at least in part on a value of B. For example, when B is equal to 1, the phase may be selected from 3 possible values (e.g., 0, π, and 2π). When B is equal to 2, the phase may be selected from 5 possible values $$\left(\text{e.g., } 0, \frac{\pi}{2}, \pi, \frac{3\pi}{2}, 2\pi \right).$$

By using the quantized values of the phase, processor resources and signaling resources of the UE 120 may be conserved. In some aspects, the UE 120 may determine a value of B. For example, the UE 120 may determine the value of B based at least in part on an estimated signal to noise ratio (SNR) associated with the channel and/or the like.

As further shown, the UE 120 may determine one or more cross-correlation values. For example, the UE 120 may determine the one or more cross-correlation values because the BS 110 may not have access to the UE-specific codebook used by the UE 120 to process the channel. The one or more cross-correlation values may provide information that the BS 110 can use in lieu of the UE-specific codebook to improve accuracy of estimation of the channel. As a particular example, the UE 120 may use Equation 5 to determine the cross-correlation values:

$$\rho_m^{(i)} = (g_{Tr,k_1}^{(i)})^H g_{Tr,k_m}^{(i)}, m=1, \ldots, K, i=1, \ldots, S \qquad \text{Equation 5}$$

Here, a cross-correlation value is determined for an mth beam and an ith UE 120 based at least in part on UE-specific codebook values for a best beam of the K beams and the mth beam of the K beams. By determining the cross-correlation value based at least in part on comparing the UE-specific codebook values, the UE 120 can provide information for the BS 110 to determine a channel estimation without providing information identifying the UE-specific codebook values.

As further shown, the UE 120 may determine respective gNB codebook indices of the K beams. For example, the UE 120 may determine the respective gNB codebook indices based at least in part on information included in the best K beams.

As shown by reference number 520, the UE 120 may provide feedback information to the BS 110. The feedback information may identify at least one of the determined information (e.g., the cross-correlation information, the estimates of the phase of the best K beams, the gNB codebook indices, and the RSRP information). For example, the feedback information may include the quantization (e.g., B-bit quantization) of the phase estimates, the cross-correlations, the codebook indices, the RSRP of the best K beams, and/or the like.

As shown in FIG. 5B, and by reference number 525, the BS 110 may receive feedback information for a plurality of UEs 120. For example, the feedback information may relate to respective pluralities of beams of the plurality of UEs 120. As further shown, the feedback information may identify at least one of cross-correlations of the pluralities of beams, phase estimates for the pluralities of beams, codebook indices or beam indices of the plurality of beams, measurements associated with the pluralities of beams (e.g., RSRP and/or the like), and/or the like. In some aspects, the phase estimates may be provided in a quantized form.

As shown by reference number 530, the BS 110 may construct an estimated channel matrix H using the feedback information. Furthermore, by using the phase estimates, the estimated channel matrix H may be more accurate than an estimated channel matrix that is generated without using the phase estimates. As a particular example, for a group of UEs 1 through S that are each associated with respective groups of beams 1 through m, the BS 110 may use Equation 6 to determine the estimated channel matrix:

$$\hat{\mathcal{H}}|_{S \times N_t} = \begin{bmatrix} \sum_{m=1}^{K} \sqrt{RSRP_m^{(1)}} \, e^{j\psi_{pr,m}^{(1)}} \cdot g_{Tr,k_m}^{(1)} \left(f_{Tr,j_m}^{(1)}\right)^H \\ \vdots \\ \sum_{m=1}^{K} \sqrt{RSRP_m^{(S)}} \, e^{j\psi_{pr,m}^{(S)}} \cdot g_{Tr,k_m}^{(S)} \left(f_{Tr,j_m}^{(S)}\right)^H \end{bmatrix} \qquad \text{Equation 6}$$

Each column of the matrix determined using Equation 6 may correspond to a different UE 120. The BS 110 may determine respective beams for the plurality of UEs 120 based at least in part on the columns of the matrix, as described in more detail below.

As shown by reference number 535, the BS 110 may identify a beam for each UE 120 of the plurality of UEs 120 using the estimated channel matrix. For example, the UE 120 may determine unit-norm column vectors of the estimated channel matrix using the equation $\hat{\mathcal{H}}^H \cdot (\hat{\mathcal{H}} \hat{\mathcal{H}}^H)^{-1}$. Each unit-norm column vector may identify a beam for a respective UE 120. In this way, the BS 110 may determine beams for a plurality of UEs 120 based at least in part on feedback regarding pluralities of beams associated with the UEs 120 and phase feedback for the UEs 120, which improves efficiency of the beams and improves accuracy of the estimated channel matrix.

As shown by reference number 540, the BS 110 may schedule traffic for the UEs 120 using the beams. For example, the BS 110 may use a scheduling technique (e.g., proportional-fair, greedy, round-robin, etc.) to schedule the traffic using the beams identified by the unit-norm column vectors. In this way, performance of the beams associated with the plurality of UEs 120 is improved.

As indicated above, FIGS. 5A and 5B are provided as examples. Other examples are possible and may differ from what was described with respect to FIGS. 5A and 5B.

Figure 6:
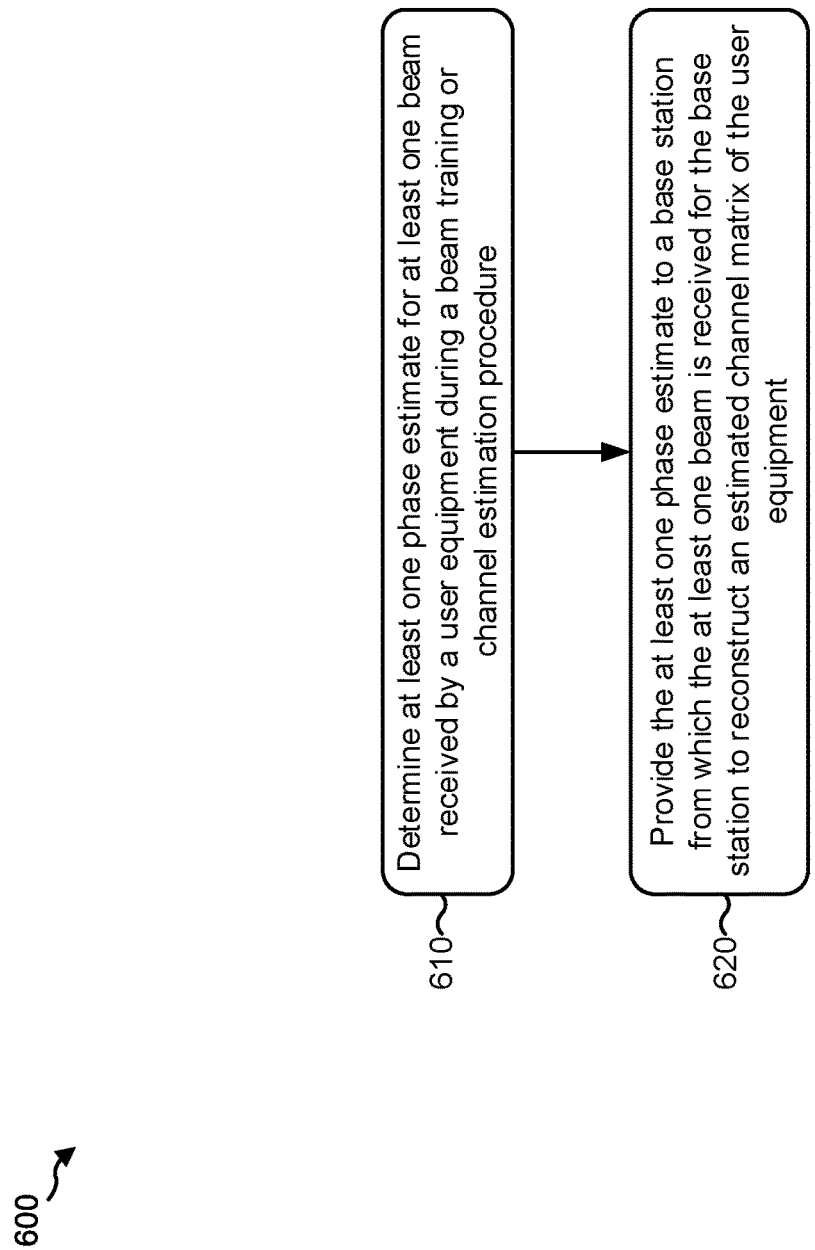
FIG. 6 is a diagram illustrating an example process performed, for example, by a user equipment, in accordance with various aspects of the present disclosure.

FIG. 6 is a diagram illustrating an example process 600 performed, for example, by a user equipment, in accordance with various aspects of the present disclosure. Example process 600 is an example where a user equipment (e.g., UE 120) performs enhanced phase feedback in mm Wave multi-user beamforming.

As shown in FIG. 6, in some aspects, process 600 may include determining at least one phase estimate for at least one beam received by a user equipment during a beam training or channel estimation procedure (block 610). For example, the user equipment (e.g., using controller/processor 280 and/or the like) may determine at least one phase estimate for at least one beam received during a beam training or channel estimation procedure. In some aspects, the phase estimate may be a quantization of a phase of the at least one beam. In some aspects, the at least one beam may include a plurality of beams.

As shown in FIG. 6, in some aspects, process 600 may include providing the at least one phase estimate to a base station from which the at least one beam is received for the base station to reconstruct an estimated channel matrix of the user equipment (block 620). For example, the user equipment (e.g., using controller/processor 280, transmit processor 264, TX MIMO processor 266, MOD 254, antenna 252, and/or the like) may provide feedback information, including the at least one phase estimate, to a base station from which the at least one beam is received. The base station may use the feedback information to estimate a channel matrix of the one or more beams. In some aspects, the feedback information may include at least one of at least one beam index (e.g., codebook index) corresponding to the at least one beam, at least one measurement associated with the at least one beam, and/or information identifying a cross-correlation associated with the at least one beam.

Process 600 may include additional aspects, such as any single aspect or any combination of aspects described below and/or in connection with one or more other processes described elsewhere herein.

In some aspects, the at least one phase estimate is determined based at least in part on a UE-specific codebook of the UE, and wherein the at least one beam is generated based at least in part on a common codebook of the UE and the base station. In some aspects, the at least one beam includes a plurality of beams, and wherein the information identifying the cross-correlation identifies a cross correlation between a selected beam and at least one other beam of the plurality of beams. In some aspects, the information identifying the cross-correlation further identifies a cross-correlation between two or more beams of the at least one other beam. In some aspects, the selected beam is selected based at least in part on at least one of an RSRP, an RSRQ, a SNR, an SINR, or a measure of channel quality.

In some aspects, the at least one phase estimate is based at least in part on a B-bit quantization of phases of the at least one beam. In some aspects, a value of B is based at least in part on an estimate of signal to noise ratio for the UE. In some aspects, the at least one phase estimate is adjusted based at least in part on at least one of phase drift associated with phase noise of an oscillator at the UE or a Doppler effect due to mobility of the UE. In some aspects, the at least one beam is selected from a plurality of beams based at least in part on the at least one measurement. In some aspects, the at least one beam is selected based at least in part on at least one of signal quality or spatial filtering of the plurality of beams. In some aspects, the at least one beam is associated with at least one of a 5th Generation millimeter wave radio access technology (RAT), a 5th Generation sub-6 GHz multi-input multi-output (MIMO) RAT, a 4th Generation multiple-input multiple-output (MIMO) RAT, or a 3rd Generation MIMO RAT.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
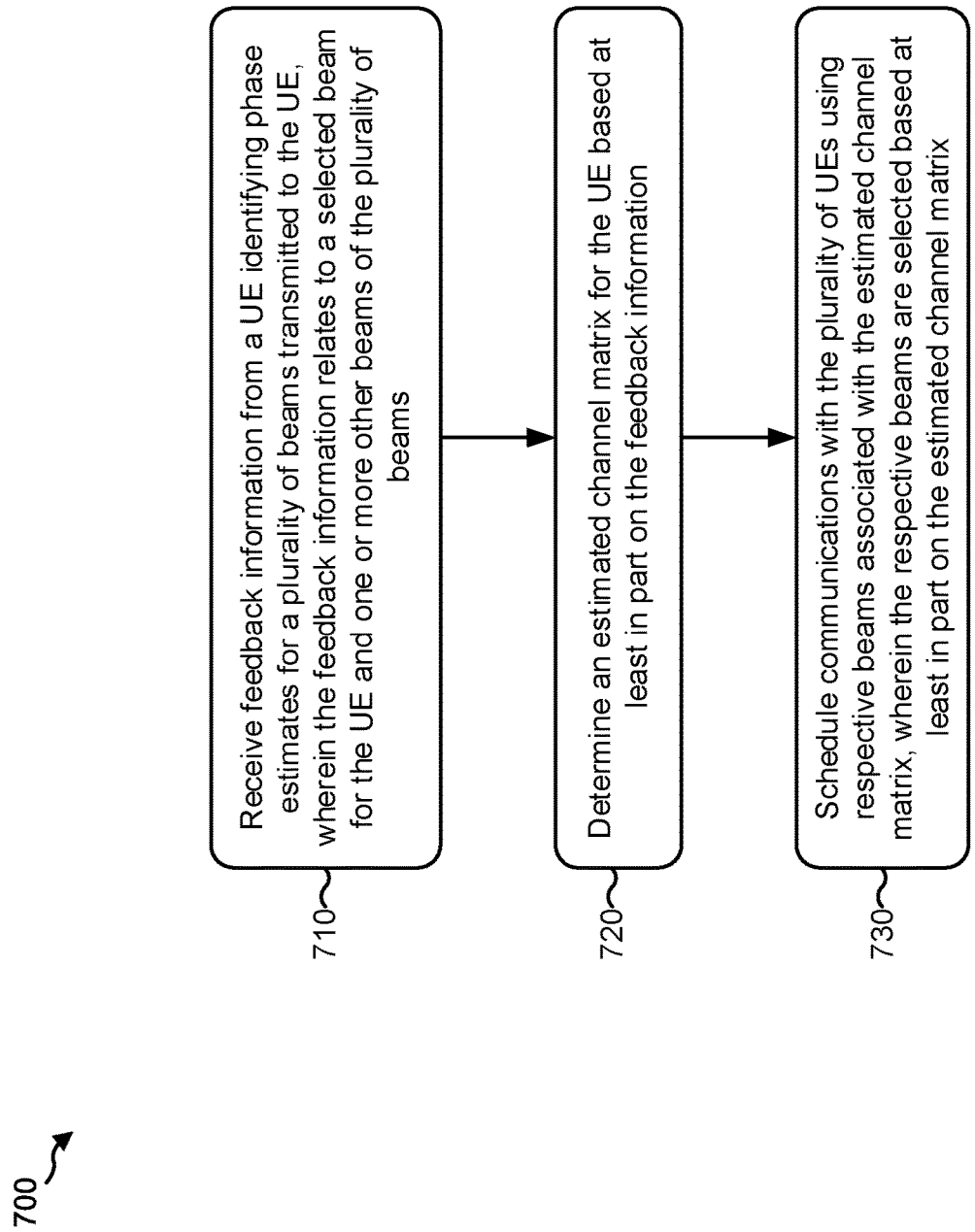
FIG. 7 is a diagram illustrating an example process performed, for example, by a user equipment, in accordance with various aspects of the present disclosure.

FIG. 7 is a diagram illustrating an example process 700 performed, for example, by a base station, in accordance with various aspects of the present disclosure. Example process 700 is an example where a base station (e.g., BS 110) performs determination of an estimated channel matrix based at least in part on enhanced phase feedback in mmWave multi-user beamforming.

As shown in FIG. 7, in some aspects, process 700 may include receiving feedback information from a UE identifying phase estimates for a plurality of beams transmitted to the UE, wherein the feedback information relates to a selected beam for the UE and one or more other beams of the plurality of beams (block 710). For example, the base station (e.g., using antenna 234, DEMOD 232, MIMO detector 236, receive processor 238, controller/processor 240, and/or the like) may receive feedback information from a UE or a plurality of UEs including the UE. The feedback information may identify phase estimates for a plurality of beams transmitted to the UE. The feedback information may relate to a selected beam (e.g., best beam) for the UE and one or more other beams of the plurality of beams.

As shown in FIG. 7, in some aspects, process 700 may include determining an estimated channel matrix for the UE based at least in part on the feedback information (block 720). For example, the base station (e.g., using controller/processor 240 and/or the like) may determine an estimated channel matrix for the UE based at least in part on the feedback information. In some aspects, the base station may determine the estimated channel matrix based at least in part on the phase estimates, which improves accuracy of the estimated channel matrix relative to a channel matrix determined without phase estimates.

As shown in FIG. 7, in some aspects, process 700 may include scheduling communications with the plurality of UEs using respective beams associated with the estimated channel matrix, wherein the respective beams are selected based at least in part on the estimated channel matrix (block 730). For example, when the UE is one of a plurality of UEs, the base station (e.g., using controller/processor 240, transmit processor 220, TX MIMO processor 230, MOD 232, antenna 234, and/or the like) may schedule communications for the plurality of UEs. The base station may schedule the communications using respective beams that are associated with or determined based at least in part on the estimated channel matrix.

Process 700 may include additional aspects, such as any single aspect or any combination of aspects described below and/or in connection with one or more other processes described elsewhere herein.

In some aspects, the feedback information includes at least one of at least one beam index corresponding to the selected beam and the one or more other beams, at least one measurement associated with the selected beam and the one or more other beams, or information identifying a cross-correlation between the selected beam and another beam of the one or more other beams.

In some aspects, the selected beam is selected from the plurality of beams based at least in part on a measurement associated with the selected beam being a best measurement of the plurality of beams. In some aspects, the estimated channel matrix relates to a plurality of UEs including the UE, and wherein the estimated channel matrix is determined using feedback information regarding the plurality of UEs. In some aspects, the respective beams are selected according to a functional form of the estimated channel matrix, wherein the functional form is determined based at least in part on a Hermitian matrix corresponding to the estimated channel matrix.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8A:
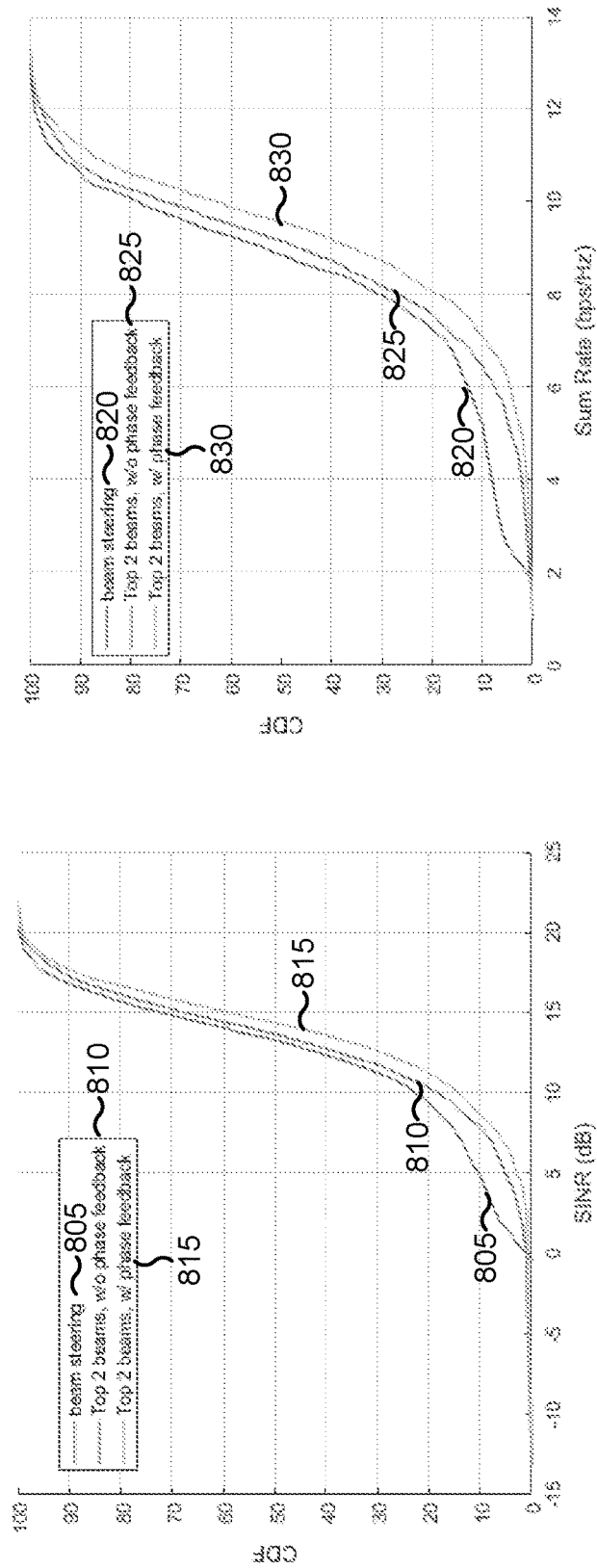
FIGS. 8A and 8B are diagrams illustrating examples of results that might be achieved using enhanced phase feedback in mm Wave multi-user beamforming, in accordance with various aspects of the present disclosure.
Figure 8B:
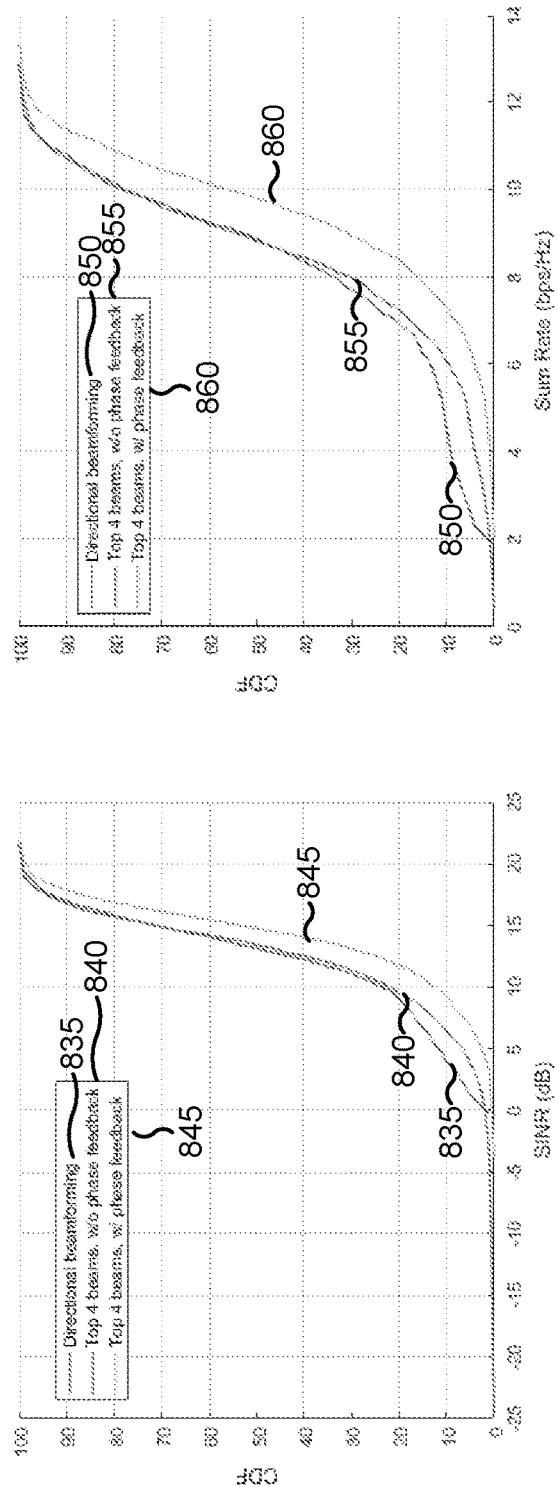

FIGS. 8A and 8B are diagrams illustrating examples 800 of results that might be achieved using enhanced phase feedback in mm Wave multi-user beamforming, in accordance with various aspects of the present disclosure. FIG. 8A illustrates an example of improvements to signal to interference and noise ratio (SINR) and data rate for UEs providing phase feedback for two beams, and FIG. 8B illustrates an example of improvements to SINR and data rate for UEs providing phase feedback for four beams.

As shown in FIG. 8A, reference number 805 may illustrate SINR for a BS 110 using a beam steering technique without feedback from UEs 120, reference number 810 may illustrate SINR for a BS 110 using feedback with regard to a best two beams without phase feedback, and reference number 815 may illustrate SINR for a BS 110 using feedback with regard to a best two beams and taking into account phase feedback. As can be seen, SINR performance is improved by the introduction of phase feedback.

Similarly, reference number 820 may illustrate a data rate for a BS 110 using a beam steering technique without feedback from UEs 120, reference number 825 may illustrate a data rate for a BS 110 using feedback with regard to a best two beams without phase feedback, and reference number 830 may illustrate a data rate for a BS 110 using feedback with regard to a best two beams and taking into account phase feedback. As can be seen, data rate is improved by the introduction of phase feedback.

As shown in FIG. 8B, reference number 835 may illustrate SINR for a BS 110 using a directional beamforming technique without feedback from UEs 120, reference number 840 may illustrate SINR for a BS 110 using feedback with regard to a best four beams without phase feedback, and reference number 845 may illustrate SINR for a BS 110 using feedback with regard to a best four beams and taking into account phase feedback. As can be seen, SINR performance is improved by the introduction of phase feedback. Furthermore, the usage of feedback information for a best four beams may improve SINR performance relative to the usage of feedback information for a best two beams, as illustrated in FIG. 8A.

Similarly, reference number 850 may illustrate a data rate for a BS 110 using a beam steering technique without feedback from UEs 120, reference number 855 may illustrate a data rate for a BS 110 using feedback with regard to a best four beams without phase feedback, and reference number 860 may illustrate a data rate for a BS 110 using feedback with regard to a best four beams and taking into account phase feedback. As can be seen, a data rate is improved by the introduction of phase feedback. Furthermore, the usage of feedback information for a best four beams may improve SINR performance relative to the usage of feedback information for a best two beams, as illustrated in FIG. 8A.

As indicated above, FIGS. 8A and 8B are provided as examples. Other examples are possible and may differ from what is described in connection with FIGS. 8A and 8B.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining at least one phase estimate for at least one beam received by the UE during a beam training or channel estimation procedure,
      wherein the at least one phase estimate comprises a B-bit quantized value corresponding to a phase and a value of B is based at least in part on an estimate of signal to noise ratio for the UE; and
   providing the at least one phase estimate and information identifying a cross-correlation associated with the at least one beam to a base station from which the at least one beam is received for the base station to reconstruct an estimated channel matrix of the UE,
      wherein the information identifying the cross-correlation associated with the at least one beam is determined based at least in part on UE-specific codebook values.

2. The method of claim 1, wherein the at least one phase estimate is determined based at least in part on a UE-specific codebook of the UE, and wherein the at least one beam is generated based at least in part on a common codebook of the base station.

3. The method of claim 1, wherein the at least one beam includes a plurality of beams, and wherein the information identifying the cross-correlation identifies a cross correlation between a selected beam of the plurality of beams and at least one other beam of the plurality of beams.

4. The method of claim 3, wherein the information identifying the cross-correlation further identifies a cross-correlation between two or more beams of the at least one other beam.

5. The method of claim 3, wherein the selected beam is selected based at least in part on at least one of:
   a reference signal received power,
   a reference signal received quality,
   a signal to noise ratio,
   a signal to interference plus noise ratio, or
   a measure of channel quality.

6. The method of claim 1, wherein the at least one phase estimate is adjusted based at least in part on at least one of:
   phase drift associated with phase noise of an oscillator at the UE, or
   a Doppler effect due to mobility of the UE.

7. The method of claim 1, wherein the at least one beam is selected from a plurality of beams based at least in part on at least one measurement associated with the at least one beam.

8. The method of claim 7, wherein the at least one beam is selected based at least in part on at least one of signal quality or spatial filtering of the plurality of beams.

9. The method of claim 1, wherein the at least one beam is associated with at least one of:
   a 5th Generation millimeter wave radio access technology (RAT),
   a 5th Generation sub-6 GHz multi-input multi-output (MIMO) RAT,
   a 4th Generation MIMO RAT, or
   a 3rd Generation MIMO RAT.

10. The method of claim 1, wherein the information identifying the cross-correlation is determined for a selected beam, of the at least one beam, and a selected UE.

11. The method of claim 1, wherein the at least one phase estimate is provided with at least one of:
   at least one beam index corresponding to the at least one beam, or
   at least one measurement associated with the at least one beam.

12. A method of wireless communication performed by a base station, comprising:
   receiving feedback information from a user equipment (UE) identifying phase estimates for a plurality of beams transmitted to the UE,
      wherein the feedback information relates to a selected beam for the UE and one or more other beams of the plurality of beams,
      wherein the feedback information includes information identifying a cross-correlation associated with the selected beam determined based at least in part on UE-specific codebook values, and
      wherein each of the phase estimates comprises a B-bit quantized value corresponding to a phase and a value of B is based at least in part on an estimate of signal to noise ratio for the UE; and
   determining an estimated channel matrix for the UE based at least in part on the feedback information.

13. The method of claim 12, wherein the feedback information further includes at least one of:
   at least one beam index corresponding to the selected beam and the one or more other beams, or
   at least one measurement associated with the selected beam and the one or more other beams.

14. The method of claim 12, wherein the selected beam is selected from the plurality of beams based at least in part on a measurement associated with the selected beam being a best measurement of the plurality of beams.

15. The method of claim 12, wherein the estimated channel matrix relates to a plurality of UEs including the UE, and wherein the estimated channel matrix is determined using feedback information regarding the plurality of UEs.

16. The method of claim 15, further comprising:
   scheduling communications with the plurality of UEs using respective beams associated with the estimated channel matrix, wherein the respective beams are selected based at least in part on the estimated channel matrix.

17. The method of claim 16, wherein the respective beams are selected according to a functional form of the estimated channel matrix,
   wherein the functional form is determined based at least in part on a Hermitian matrix corresponding to the estimated channel matrix.

18. A user equipment (UE) for wireless communication, comprising:
   a memory; and
   one or more processors operatively coupled to the memory, the memory and the one or more processors configured to:
      determine at least one phase estimate for at least one beam received by the UE during a beam training or channel estimation procedure,
         wherein the at least one phase estimate comprises a B-bit quantized value corresponding to a phase and a value of B is based at least in part on an estimate of signal to noise ratio for the UE; and
      provide the at least one phase estimate and information identifying a cross-correlation associated with the at least one beam to a base station from which the at least one beam is received for the base station to reconstruct an estimated channel matrix of the UE, wherein the information identifying the cross-correlation associated with the at least one beam is determined based at least in part on UE-specific codebook values.

19. The UE of claim 18, wherein the at least one phase estimate is determined based at least in part on a UE-specific codebook of the UE, and wherein the at least one beam is generated based at least in part on a common codebook of the base station.

20. The UE of claim 18, wherein the at least one beam includes a plurality of beams, and wherein the information identifying the cross-correlation identifies a cross correlation between a selected beam of the plurality of beams and at least one other beam of the plurality of beams.

21. The UE of claim 20, wherein the information identifying the cross-correlation further identifies a cross-correlation between two or more beams of the at least one other beam.

22. The UE of claim 18, wherein the at least one phase estimate is adjusted based at least in part on at least one of:
   phase drift associated with phase noise of an oscillator at the UE, or
   a Doppler effect due to mobility of the UE.

23. The UE of claim 18, wherein the at least one beam is selected from a plurality of beams based at least in part on at least one measurement associated with the at least one beam.

24. The UE of claim 23, wherein the at least one beam is selected based at least in part on at least one of signal quality or spatial filtering of the plurality of beams.

25. The UE of claim 18, wherein the information identifying the cross-correlation is determined for a selected beam, of the at least one beam, and a selected UE.

26. The UE of claim 18, wherein the at least one phase estimate is provided with at least one of:
   at least one beam index corresponding to the at least one beam, or
   at least one measurement associated with the at least one beam.

27. A base station for wireless communication, comprising:
   a memory; and
   one or more processors operatively coupled to the memory, the memory and the one or more processors configured to:
      receive feedback information from a user equipment (UE) identifying phase estimates for a plurality of beams transmitted to the UE,
         wherein the feedback information relates to a selected beam for the UE and one or more other beams of the plurality of beams,
         wherein the feedback information includes information identifying a cross-correlation associated with the selected beam determined based at least in part on UE-specific codebook values, and
         wherein each of the phase estimates comprises a B-bit quantized value corresponding to a phase and a value of B is based at least in part on an estimate of signal to noise ratio for the UE; and
      determine an estimated channel matrix for the UE based at least in part on the feedback information.

28. The base station of claim 27, wherein the selected beam is selected from the plurality of beams based at least in part on a measurement associated with the selected beam being a best measurement of the plurality of beams.

29. The base station of claim 27, wherein the estimated channel matrix relates to a plurality of UEs including the UE, and wherein the estimated channel matrix is determined using feedback information regarding the plurality of UEs.

30. The base station of claim 29, wherein the one or more processors are further configured to:
   schedule communications with the plurality of UEs using respective beams associated with the estimated channel matrix, wherein the respective beams are selected based at least in part on the estimated channel matrix.

* * * * *